(12) United States Patent
Chou

(10) Patent No.: US 9,071,123 B2
(45) Date of Patent: Jun. 30, 2015

(54) VOICE COIL MOTOR

(71) Applicant: Tai-Hsu Chou, New Taipei (TW)

(72) Inventor: Tai-Hsu Chou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 174 days.

(21) Appl. No.: 13/719,239

(22) Filed: Dec. 19, 2012

(65) Prior Publication Data

US 2013/0221766 A1    Aug. 29, 2013

(30) Foreign Application Priority Data

Feb. 24, 2012 (TW) ............................. 101106304 A

(51) Int. Cl.
| | | |
|---|---|---|
| *H02K 41/035* | (2006.01) | |
| *H02K 41/02* | (2006.01) | |
| *G02B 7/08* | (2006.01) | |
| *G03B 3/10* | (2006.01) | |
| *G03B 5/00* | (2006.01) | |

(52) U.S. Cl.
CPC ............ *H02K 41/02* (2013.01); *H02K 41/0358* (2013.01); *G02B 7/08* (2013.01); *H02K 41/0356* (2013.01); *G03B 3/10* (2013.01); *G03B 5/00* (2013.01); *G03B 2205/0069* (2013.01)

(58) Field of Classification Search
CPC .............. H02K 41/02; H02K 41/0356; H02K 41/0358; G03B 3/10; G03B 2205/0069
USPC ................................ 310/12.16; 359/814, 824
See application file for complete search history.

(56) References Cited

U.S. PATENT DOCUMENTS

| | | | | |
|---|---|---|---|---|
| 8,638,510 B2* | 1/2014 | Lee et al. | ...................... | 359/824 |
| 8,754,553 B2* | 6/2014 | Liao | ........................... | 310/12.16 |
| 2008/0036304 A1* | 2/2008 | Ho et al. | ........................ | 310/12 |
| 2010/0117460 A1* | 5/2010 | Liao | ........................... | 310/12.16 |
| 2010/0128372 A1* | 5/2010 | Wang | ............................ | 359/824 |

* cited by examiner

*Primary Examiner* — Hanh Nguyen
(74) *Attorney, Agent, or Firm* — Novak Druce Connolly Bove + Quigg LLP

(57) ABSTRACT

A voice coil motor includes a case, a stationary module, and a movable module. The stationary module is retained within the case, and includes a housing and a number of magnets. The housing and the plurality of magnets are integrally formed. The movable module is movably retained within the case, and includes a barrel and a coil coupled to the barrel. When electric current is applied to the coil, the coil generates a magnetic field and the magnetic field repels the magnets, thereby driving the movable module to move.

6 Claims, 3 Drawing Sheets

VOICE COIL MOTOR

BACKGROUND

1. Technical Field

The present disclosure relates to voice coil motors, and particularly, to a voice coil motor that can be easily assembled.

2. Description of Related Art

Voice coil motors are commonly used in lens modules for driving lens holders of the lens modules to move with respect to cases of the lens modules. Although voice coil motors can satisfy basic requirements, a new voice coil motor that is easy to be assembled is still needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
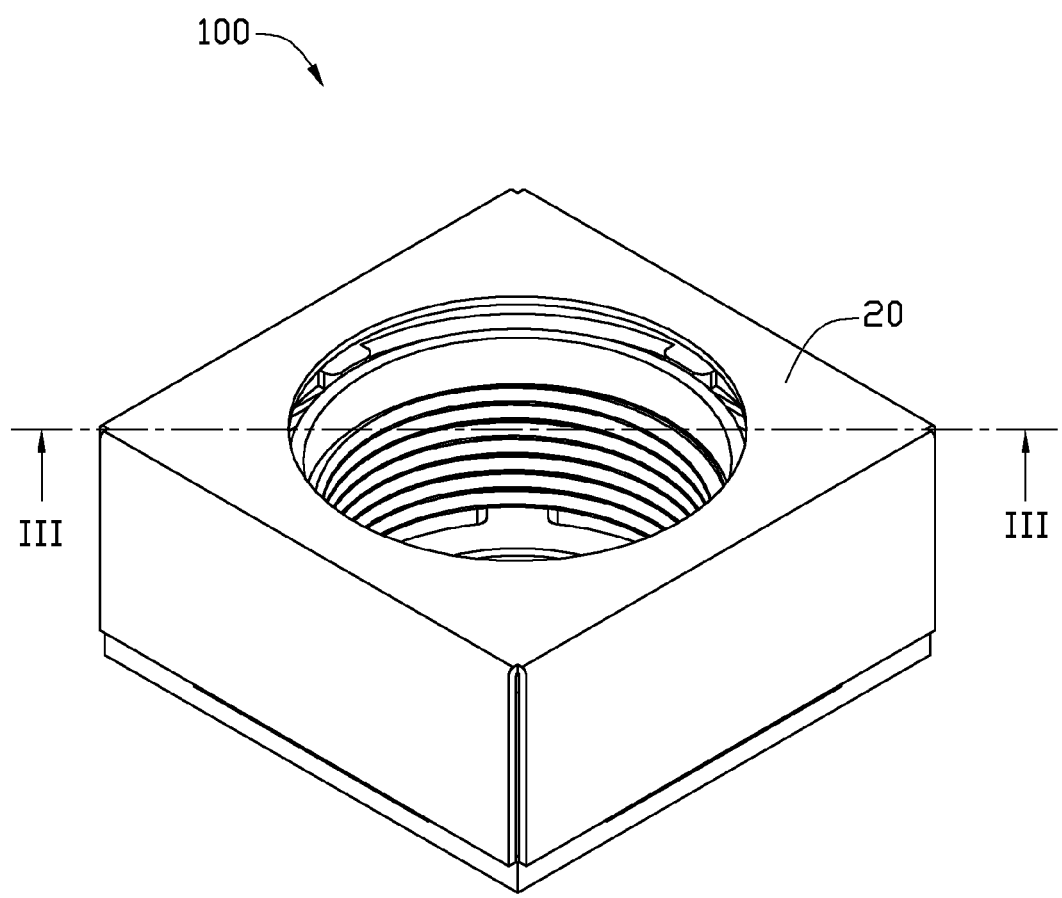
FIG. 1 is an isometric view of a voice coil motor in accordance with an exemplary embodiment.
Figure 2:
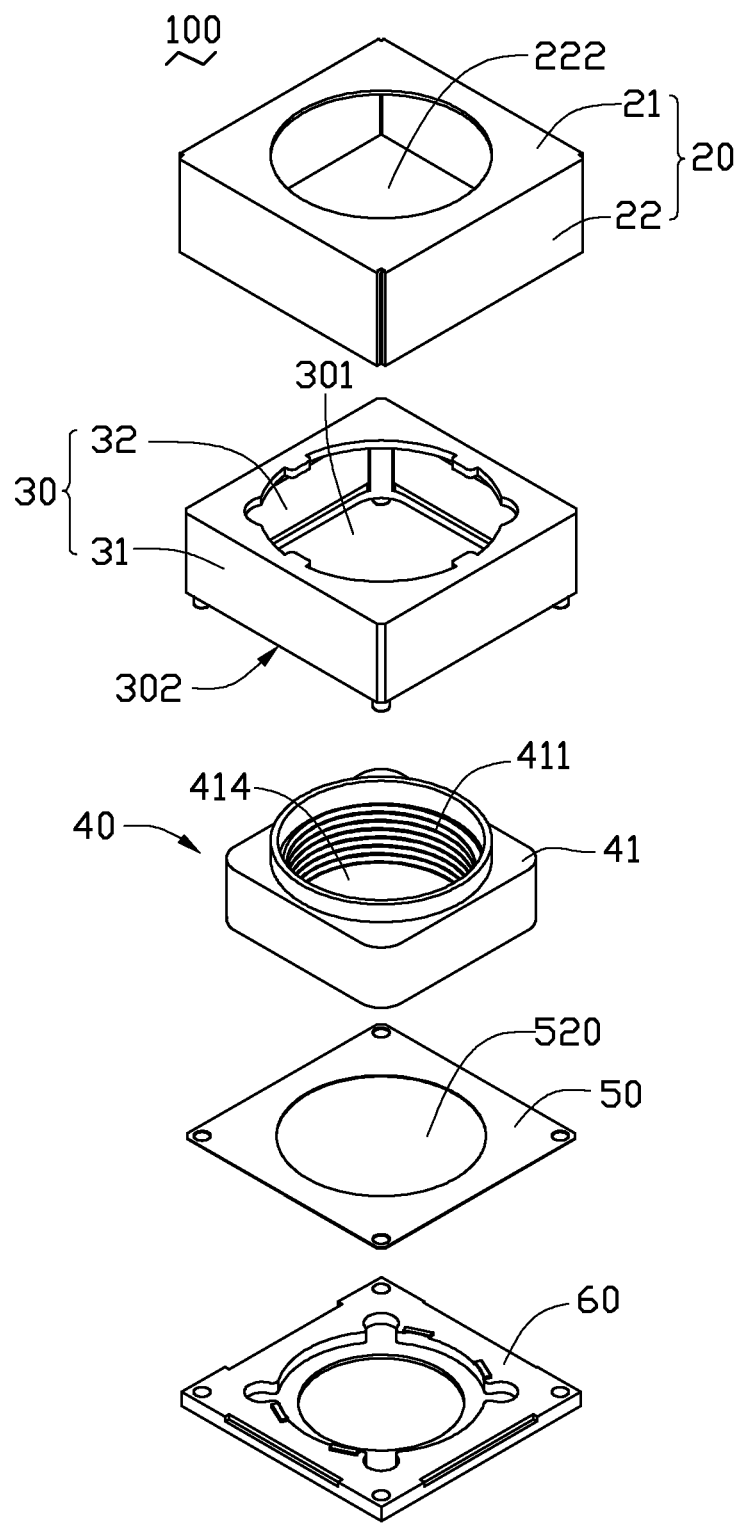
FIG. 2 is an isometric, exploded view of the voice coil motor of FIG. 1.

Referring to FIGS. 1 and 2, a voice coil motor 100 includes a case 20, a stationary module 30, a movable module 40, a resilient sheet 50, and a cap 60 coupled to a bottom end of the case 20. The case 20 includes a top plate 21 and four sidewalls 22 protruding from four edges of the top plate 21. The sidewalls 22 are connected to each other and are substantially perpendicular to the top plate 21. The top plate 21 and the sidewalls 22 cooperatively define a chamber to receive the stationary module 30, the movable module 40, and the resilient sheet 50. The top plate 21 defines a through hole 222 that allows light to pass therethrough, such that the light can project onto an image sensor (not shown). The case 20 is able to shield the electronic components therein, which prevents the electronic components from being interfered by electromagnetic.

The stationary module 30 includes a hollow housing 31 and four magnets 32 arranged on the inner surface of the hollow housing 31. In the embodiment, the magnets 32 and the housing 31 are integrally formed by low-temperature insert molding. The hollow housing 31 includes four sidewalls 303 that are connected to each other, which defines a space 301 to receive the movable module 40. Each sidewall 303 defines a recess 305 in its inner side. The four magnets 32 are securely retained within the recesses 305 of the sidewall 303. One side of the magnet 32 faces the space 301. It is noted that the shape and configuration of the housing 31 is not limited, and can be varied according to need. The resilient sheet 50 is coupled to a bottom end 302 of the housing 31 (FIG. 3).

Figure 3:
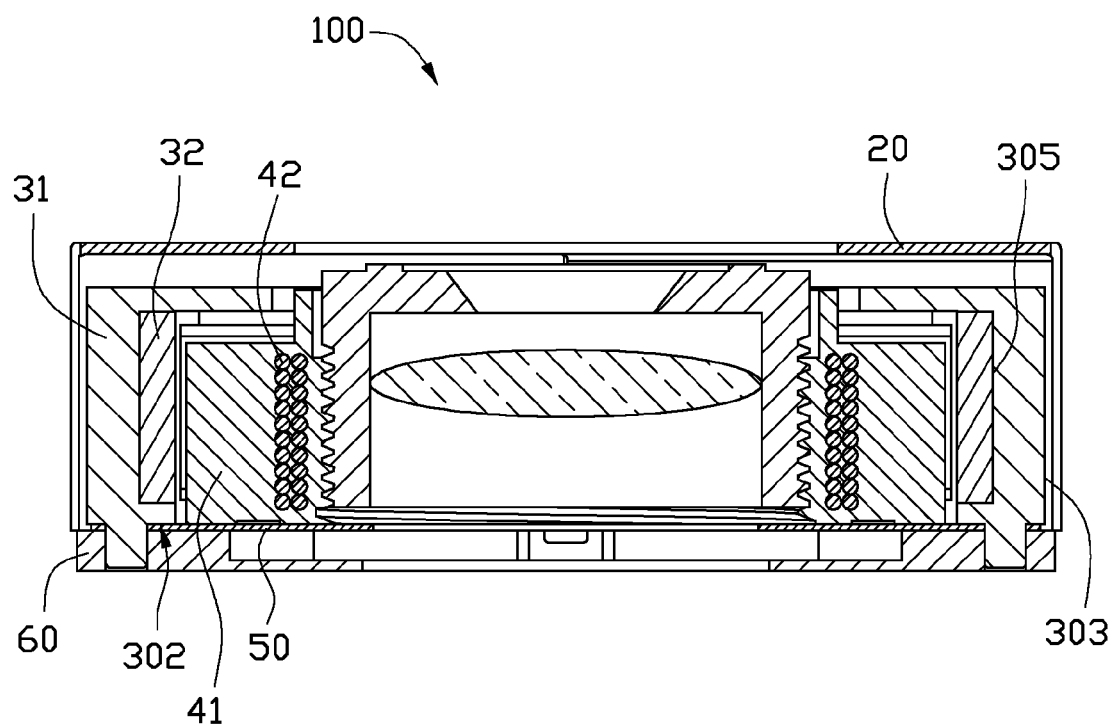
FIG. 3 is a planar cross-sectional view taken along line III-III of FIG. 1.

Referring to FIG. 3, the movable module 40 is received in the housing 31 and includes a barrel 41 and a coil 42. In the embodiment, the barrel 41 and the coil 42 are integrally formed. The coil 42 is completely retained within the barrel 41. A cable (not shown) connected to the coil 42 extends out of the barrel 41 and is connected to a circuit, such that electric current can be provided to the coil 42 via the circuit. The barrel 41 defines a through hole 414 including a cylindrical lateral surface that defines an inner thread 411. The through hole 414 is used to receive a lens holder.

The resilient sheet 50 is a rectangular thin sheet and defines a through hole 520 that allows light passes therethrough. The resilient sheet 50 abuts against the bottom end 302 of the housing 31. When electric current is applied to the coil 42, the coil 42 generates a magnetic field that repels the magnets 32, thereby driving the movable module 40 to move toward the cap 60. During the moving of the movable module 40, the resilient sheet 50 deforms due to the pushing from the movable module 40 and applies a push force to the movable module 40. After electric current to the coil 42 is cut off, the resilient sheet 50 rebounds and pushes the movable module 40 to its original position.

Because both of the stationary module and the movable module are integrally formed, the process of assembling the magnets to the housing and assembling the coil to the barrel can be omitted, which facilitates the fast assembling of the voice coil motor.

While various embodiments have been described and illustrated, the disclosure is not to be construed as being limited thereto. Various modifications can be made to the embodiments by those skilled in the art without departing from the true spirit and scope of the present disclosure as defined by the appended claims.

What is claimed is:

1. A voice coil motor comprising:
a case;
a stationary module retained within the case, the stationary module comprising a housing and a plurality of magnets, and the housing and the plurality of magnets being integrally formed; and
a movable module movably retained within the case and received in the housing, the movable module comprising a barrel and a coil completely embedded in the barrel, wherein when electric current is applied to the coil, the coil generates a magnetic field and the magnetic field repels the magnets, thereby driving the movable module to move.

2. The voice coil motor according to claim 1, wherein the housing is hollow and comprises a plurality of sealed sidewalls, the sidewalls define a space for receiving the moveable module, each sidewall defines a recess in its inner side to receive one of the plurality of magnets, and the recesses open toward the space.

3. The voice coil motor according to claim 1, wherein the barrel and the coil are integrally formed.

4. The voice coil motor according to claim 1, wherein the housing and the plurality of magnets are integrally formed by insert molding.

5. The voice coil motor according to claim 1 further comprising a resilient sheet coupled to an end of the case to apply a push force to the movable module.

6. The voice coil motor according to claim 5, wherein the resilient sheet defines a through hole to allow light pass therethrough.

* * * * *